(12) United States Patent
Derat et al.

(10) Patent No.: US 12,467,963 B2
(45) Date of Patent: Nov. 11, 2025

(54) METHOD OF EVALUATING AN ELECTROMAGNETIC FIELD

(71) Applicants: Rohde & Schwarz GmbH & Co. KG, Munich (DE); IMST GmbH, Kamp-Lintfort (DE)

(72) Inventors: Benoit Derat, Munich (DE); Mert Celik, Munich (DE); Winfried Simon, Kamp-Lintfort (DE); David Schaefer, Kamp-Lintfort (DE)

(73) Assignees: Rohde & Schwarz GmbH & Co. KG, Munich (DE); IMST GmbH, Kamp-Lintfort (DE)

(*) Notice: Subject to any disclaimer, the term of this patent is extended or adjusted under 35 U.S.C. 154(b) by 169 days.

(21) Appl. No.: 18/364,218

(22) Filed: Aug. 2, 2023

(65) Prior Publication Data

US 2025/0044334 A1 Feb. 6, 2025

(51) Int. Cl.
*G01R 29/08* (2006.01)
*G01R 29/10* (2006.01)

(52) U.S. Cl.
CPC .......... *G01R 29/0892* (2013.01); *G01R 29/10* (2013.01)

(58) Field of Classification Search
CPC . G01R 29/0892; G01R 29/10; G01R 29/0814

USPC .................................................... 324/754.31
See application file for complete search history.

(56) References Cited

U.S. PATENT DOCUMENTS

| | | | |
|---|---|---|---|
| 6,714,008 B1 | 3/2004 | Holmes et al. | |
| 11,671,186 B1 | 6/2023 | Derat | |
| 11,698,401 B1* | 7/2023 | Derat | G06F 30/20 |
| | | | 324/638 |
| 2004/0161028 A1* | 8/2004 | Roberts | H03M 1/1085 |
| | | | 375/227 |
| 2006/0251200 A1* | 11/2006 | Miller | G01R 31/31709 |
| | | | 375/371 |
| 2013/0002275 A1 | 1/2013 | Min et al. | |
| 2015/0309101 A1* | 10/2015 | Ballo | G01R 23/20 |
| | | | 324/614 |
| 2019/0086459 A1 | 3/2019 | Alavi et al. | |
| 2020/0041563 A1 | 2/2020 | Tinnemans et al. | |

OTHER PUBLICATIONS

European search report for EP 24188772 (Year: 2023).*

* cited by examiner

*Primary Examiner* — Christopher P McAndrew
(74) *Attorney, Agent, or Firm* — CHRISTENSEN O'CONNOR JOHNSON KINDNESS PLLC

(57) ABSTRACT

The present disclosure relates to techniques for evaluating an electromagnetic field of a device under test.

18 Claims, 2 Drawing Sheets

METHOD OF EVALUATING AN ELECTROMAGNETIC FIELD

FIELD OF THE DISCLOSURE

Embodiments of the present disclosure relate to a method of evaluating an electromagnetic field of a device under test.

BACKGROUND

It is known in the state of the art to evaluate an electromagnetic field of a device under test, for instance an electromagnetic field radiated by the device under test that may have an antenna. However, the evaluation may become complex and time-consuming in case nearby scatterers are present or the evaluation shall take place inside a scattering object.

Nowadays, antennas to be tested are used in different applications. The antennas may be integrated in complex structures, for instance in a bumper of a vehicle. Additionally, complex scenarios may be tested according to which an antenna radiates near a body or a head of a person, for instance in case of antennas of mobile devices. Thus, the electromagnetic field has to be characterized in complex conditions, resulting in complex test scenarios.

It has turned out that large calculation errors occur when scatterers are in close proximity of the device under test. This may occur in case the device under test is integrated in a complex structure, e.g. a bumper of a vehicle, or used under difficult conditions like close to a body or head.

In the state of the art, these scenarios have to be dealt with by using a detailed numerical model of the radiation source which however requires in-depth knowledge of the device under test. Clearly, such a-priori knowledge of the device under test is not always provided.

Accordingly, a different approach is used according to which the electromagnetic field is evaluated based on an equivalent source that is used for modeling. The respective modelling allows to account for interactions between the device under test, particularly its antenna, as well as the environment. The calculations done typically comprise a normalization of the power of the source radiating the electromagnetic field, namely the device under test. This is crucial, as an incorrect normalization affects all modeled power transfers in the computational domain with the same error.

In an ideal scenario, the equivalent source is determined that would have similar characteristics, e.g. radiate a similar power, as the real one, which relates to an a-priori power normalization. This is a reasonable approach that works well in case all scatterers are sufficiently far away from the radiating source, namely the device under test. However, it turned out that the approach is not feasible in case the scatterer is located close to the excitation source.

Accordingly, there is a need for an efficient solution to evaluate an electromagnetic field of a device under test, particularly without a-priori knowledge of the device under test.

SUMMARY

Embodiments of the present disclosure provide a method of evaluating an electromagnetic field of a device under test. In an embodiment, the method comprises the steps of: providing a device under test that radiates an electromagnetic field, performing a measurement of the device under test in order to obtain measurement data, wherein at least two components of the electromagnetic field of the device under test are measured with regard to their magnitude and phase over a measurement surface, determining an equivalent source of the device under test based on the measurement data, wherein the equivalent source has a source surface that is different to the measurement surface, providing a model that comprises the equivalent source determined and at least one modeled scatterer, wherein the equivalent source determined is used as an excitation source, creating a monitoring surface that encompasses the equivalent source, but does not encompass the at least one modeled scatterer or cross the at least one modeled scatterer, calculating an electromagnetic field of the equivalent source over the monitoring surface, evaluating a total radiated power based on the calculated electromagnetic field and presence of the at least one modeled scatterer, and determining at least one normalization factor based on the total radiated power determined and the measurement data.

The main idea is to use an in-situ normalization instead of an a-priori normalization. The in-situ normalization is based on the total radiated power determined for the equivalent source and the simulated scatterer over the monitoring surface, namely the respective electromagnetic waves crossing the monitoring surface, and the measurement data obtained when performing the measurement of the device under test, for example measuring the at least two components of the electromagnetic field with regard to their magnitude and phase over the measurement surface. For instance, the at least two components of the electromagnetic field may relate to the electrical field components with regard to the spherical coordinates, namely $E\theta$ (E_theta) and $E\varphi$ (E_phi). Alternatively, a respective magnetic component may be measured, e.g., $H\theta$ (H_theta) and $H\varphi$ (H_phi).

In other words, the total radiated power takes the fields originating from the excitation source, namely the equivalent source, and the scattered fields originating from the simulated scatterer into account.

Generally speaking, accuracy of the normalization is increased compared to solutions known in the state of the art.

In some embodiments, the respective numerical electromagnetic simulation used for calculating the equivalent source and the electromagnetic field may be based on a finite difference time domain (FDTD) technique.

In some embodiments, the model may be provided by a full wave simulation that may implement a FDTD (finite difference time domain) technique, a FEM (finite element method) technique and/or a MOM (method of moments) technique. In other words, the model is established in the simulation, wherein the model comprises the equivalent source determined and the at least one modeled scatterer.

In some embodiments, the evaluation of the total radiated power is done on the monitoring surface.

An aspect provides that an initial total radiated power (TRP) is measured, for example, when performing the measurement of the device under test on the measurement surface, wherein the at least one normalization factor is determined based on the initial total radiated power and the total radiated power determined on the monitoring surface. The measurement data inter alia comprises the initial total radiated power based on which the at least one normalization factor is determined. In some embodiments, the at least one normalization factor may be based on a quotient of the total radiated power determined for the electromagnetic field of the equivalent source over the monitoring surface as well as the initial total radiated power measured during the measurement.

Another aspect provides, for example, that a normalization factor for the power, a normalization factor for the electric field and/or a normalization factor for the magnetic field are/is calculated. Therefore, different normalization factors may be determined based on the steps performed in order to increase the accuracy of the normalization.

A further aspect provides, for example, that an initial total radiated power is measured when performing the measurement of the device under test on the measurement surface, wherein the at least one normalization factor is determined based on the initial total radiated power and the total radiated power determined on the monitoring surface. A normalization factor for the power is a quotient of the initial total radiated power and the total radiated power determined on the monitoring surface. Accordingly, the normalization factor for the power can be obtained in a simple and efficient manner.

In some embodiments, an initial power radiated may be measured when performing the measurement of the device under test on the measurement surface, wherein the at least one normalization factor is determined based on the initial total radiated power and the total radiated power determined on the monitoring surface. A normalization factor for the electric field and/or a normalization factor for the magnetic field is a square root of a quotient of the initial total radiated power and the total radiated power determined on the monitoring surface. Again, the respective normalization factors for the electric field and/or the magnetic field may be determined in an efficient manner based on the initial total radiated power obtained during the measurement of the device under test as well as the total radiated power determined when calculating the (simulated) electromagnetic field of the equivalent source over the monitoring surface.

Generally, the total radiated power determined on a respective surface, for instance the monitoring surface, means that the total radiated power going through the respective surface is determined, e.g. the influence of the excitation source (equivalent source) and the scatterer.

Another aspect provides that the equivalent source is determined, for example, such that a simulated electromagnetic field of the equivalent source on the measurement surface is similar to the electromagnetic field of the device under test measured on the measurement surface. Hence, the equivalent source is created such that it radiates on the measurement surface a similar electric field and a similar magnetic field as seen from the measurement surface when performing the measurement of the device under test.

In some embodiments, a scattered electromagnetic field of the at least one modeled scatterer may be taken into account when calculating the electromagnetic field of the equivalent source over the monitoring surface. Hence, the influence of the at least one modeled scatterer is taken into account in order to determine its influence. In some embodiments, a scattered field interacts with the electromagnetic field originating from the equivalent source, which is taken into account accordingly. In other words, an output power of the equivalent source is affected by the scattered field of the at least one modeled scatterer.

A further aspect provides that the device under test, for example, is fully encompassed by the source surface and/or the monitoring surface. The equivalent scatterer and its source surface is calculated such that the physical device under test is fully encompassed by the volume confined by the source surface. The respective simulation ensures that all simulated outgoing power is gathered on the monitoring surface.

In other words, neither the source surface nor the monitoring surface may cross the device under test. Thus, no part of the device under test is located outside of the volume defined by the respective surface, e.g. the source surface or the monitoring surface, as a volume defined by the device under test is not intersected by the respective surface.

Generally speaking, the source surface and/or the monitoring surface may have an arbitrary shape.

In some embodiments, the source surface may be as small as possible while completely encompassing the device under test. The distance from the device under test may be a few wavelengths, for instance two wavelengths or even only one wavelength. Thus, the source surface is set to be as close as possible with respect to the device under test.

In some embodiments, the equivalent source may be determined based on an algorithm applied. As discussed above, the equivalent source may be obtained during a simulation (calculation). For instance, the equivalent source is a Huygens source and the source surface is a Huygens surface. The equivalent source, for example the Huygens source, can be determined for the device under test by an over-the-air test (OTA) test system as follows.

In some embodiments, the OTA test system comprises an analysis circuit and at least one measurement antenna. In an embodiment, the determination comprises the steps of: conducting, by the at least one measurement antenna, at least two sets of measurements of electromagnetic waves emitted by the device under test, thereby generating measurement signals associated with the electromagnetic waves, namely the measurement data, determining, by the analysis circuit, at least one radiation parameter of the device under test based on the measurement signals, namely the measurement data, wherein the at least one radiation parameter is associated with the electromagnetic waves emitted by the device under test; and determining, by the analysis circuit, an equivalent source on a Huygens surface based on the at least one determined radiation parameter, wherein the equivalent source is associated with the device under test.

In some embodiments, the Huygens surface may have a defined arbitrary surface geometry. In some embodiments, the Huygens surface may be a surface that is closely surrounding the device under test.

For example, the Huygens surface may have a similar shape or the same shape as an outer surface of the device under test. Thus, the equivalent source closely resembles the device under test, such that a realistic simulation of the device under test is provided by the equivalent source.

For example, the Huygens surface may be cubical, cuboidal, cylindrical, circular-cylindrical, or spherical. However, the Huygens surface may have any other surface geometry, i.e. the surface geometry may be arbitrarily complex.

In some embodiments, the equivalent source comprises at least one equivalent electric current and/or at least one equivalent magnetic current. In general, the at least one equivalent electric current and the at least one equivalent magnetic current are determined such that electromagnetic waves emitted by these currents are similar to the electromagnetic waves emitted by the device under test, when viewed from the measurement surface. In other words, the at least one equivalent electric current and the at least one equivalent magnetic current serve as model parameters for the simulation of the device under test, e.g. when modeling the equivalent source.

In some embodiments, the equivalent source may be determined by solving a corresponding inverse mathematical equation based on the at least one determined radiation parameter. In general, the inverse mathematical equation may relate to sources of electromagnetic radiation comprised in the equivalent source, and to the electromagnetic fields generated by these sources. Accordingly, by solving the inverse mathematical equation, or by fitting parameters of the inverse mathematical equation to the at least one determined radiation parameter, the equivalent source can be determined.

In some embodiments, the source surface may be a numerical field surface. Since the source surface is determined based on the algorithm applied, namely a numerical electromagnetic simulation, e.g. based on a Finite Difference Time Domain—FDTD, the source surface is determined in a numerical manner.

In some embodiments, the at least one modeled scatterer may provide a scattering environment. The scattering environment may comprise more than one modeled scatterer. Therefore, the accuracy provided by the normalization can be further improved.

The (physical) device under test may be encompassed by the measurement surface. Hence, it is ensured that the total radiated power can be determined with high accuracy, as all outgoing power is measured.

For instance, the measurement surface is a spherical surface. A measurement antenna may be driven along the spherical measurement surface in order to gather the measurement data.

In some embodiments, the measurement may be a free space measurement. Alternatively or additionally, the measurement is performed in an anechoic chamber. Therefore, no disturbances of further radiation sources may have an influence on the measurement data obtained.

In some embodiments, the device under test may comprise an antenna under test. For instance, the antenna may be integrated in a complex structure, for instance behind a bumper of a vehicle.

Generally, an augmented antenna measurement may be performed, wherein a magnitude and phase measurement of the at least two electromagnetic field components, radiated by the antenna under test (AUT), is conducted in a "free-space" condition, typically realized in an anechoic chamber. Using an adequate algorithm (e.g. TUM FIAFTA), an equivalent source with a source surface encompassing the AUT is created from the measurement data. The equivalent source is then imported in a numerical modelling (e.g. an FDTD code), where the nearby scatterer(s) is/are simulated.

Generally, the numerical modelling allows to account for the interactions between the AUT and an environment provided by the scatterer(s), and thereby to compute radiated fields in complex scenarios.

The present disclosure generally allows to increase the accuracy of the power normalization in a numerical electromagnetic simulation, when an equivalent source, e.g. a Huygens source, is used as an excitation and placed in the vicinity of at least one scattering object ("modeled scatterer") or vice versa. This improvement is realized by putting the source surface, namely a numerical field surface, around the device under test. The equivalent source is placed in presence of the scattering environment, namely the at least one modeled scatterer. Then, an "in situ" normalization of the power is performed based on the total radiated power (TRP) going through the monitoring surface. Based thereon and the measurement data obtained during an initial measurement of the device under test, at least one normalization factor is calculated. The at least one normalization factor can be used to normalize the magnetic field and/or the electric field within the simulation domain.

Since the equivalent source is created such that it radiates on the measurement surface a similar electric field and a similar magnetic field as seen from the measurement surface when performing the measurement of the device under test, a relation between the physical device under test and the equivalent source is obtained. Put differently, the equivalent source is a simulated object having similar characteristics as the physical device under test as seen from the measurement surface. Since the equivalent source is a simulated object, its radiation characteristics can be simulated for other surfaces, for instance the monitoring surface while also taking effects of nearby scatterers into account. Consequently, a corresponding normalization can be done, for example in situ.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
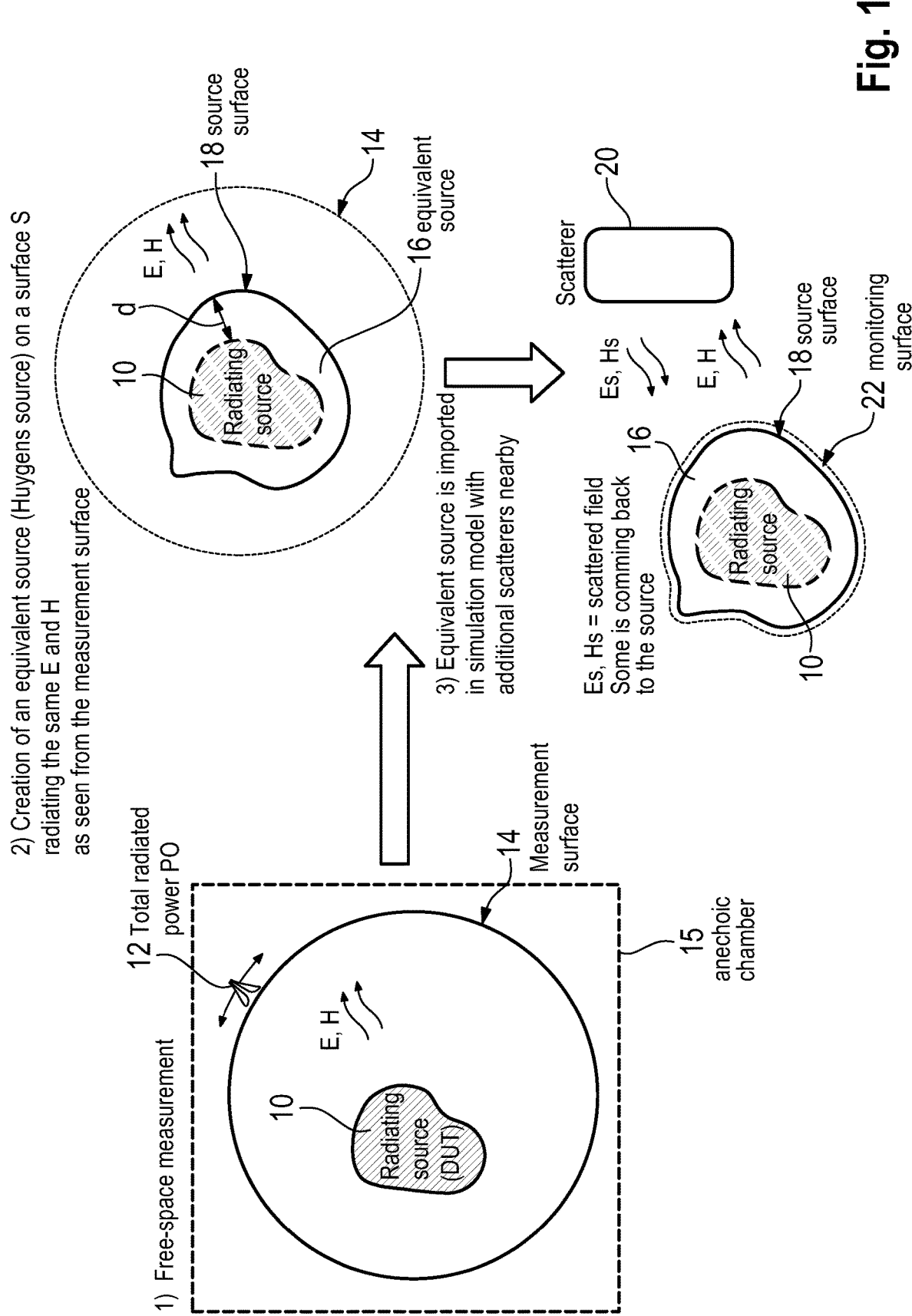
FIG. 1 schematically shows an overview illustrating a method of evaluating an electromagnetic field of a device under test according to an embodiment of the present disclosure, and FIG. 2 schematically illustrates the temporal behavior of wave packets excited by a field source in two different scenarios, namely a scatterer far away and a close scatterer.

In FIG. 1, an overview of a method of evaluating an electromagnetic field of a device under test 10 is shown.

In a first step 1), a free-space measurement of the device under test 10 may be performed by a measurement antenna 12 that performs a measurement on a measurement surface 14 in order to obtain measurement data.

The measurement data obtained is associated with at least two components of the electromagnetic field of the device under test 10 with regard to their magnitude and phase over the measurement surface 14. In the shown embodiment, the electric field E and the magnetic field H are schematically illustrated accordingly. In some embodiments, the measurement data may comprise an initial total radiated power P0 that is also measured during the measurement.

In some embodiments, the measurement antenna 12 may be movably located such that it can be moved around the device under test 10 during the measurement in order to measure the initial total radiated power (TRP) accordingly.

As shown in FIG. 1, the measurement surface 14 may relate to a spherical surface that encompasses the device under test 10 completely. However, different shapes of the measurement surface 14 may also be used.

In some embodiments, the respective measurement may be performed in an anechoic chamber 15 as schematically illustrated by the dashed lines in FIG. 1. Hence, disturbing signals can be avoided which may impair the measurement of the device under test 10.

In a second step 2), an equivalent source 16 of the device under test 10 is determined based on the measurement data obtained during the measurement along the measurement surface 14. The equivalent source 16 has a source surface 18.

As can be seen in FIG. 1, the source surface 18 is different to the measurement surface 14, as it is closer to the device under test 10. In some embodiments, the source surface 18 encompasses the device under test 10 completely. Accordingly, the source surface 18 of the equivalent source 16 does not cross the physical device under test 10.

Since the second step is done by a calculation program, the physical device under test 10 is illustrated in step 2) in a shaded manner for illustrating purposes only, namely for illustrating that the physical device under test 10 is fully encompassed by the source surface 18.

In some embodiments, the equivalent source 16 relates to an object having defined characteristics which are based on the measurement data obtained Thus, the equivalent source 16 is a simulated object having similar characteristics as the physical device under test 10 as seen from the measurement surface 14 illustrated by the dashed lines in step 2).

In some embodiments, the source surface 18 may have a distance d of a few wavelengths from the physical device under test 10, for example one wavelength. The size or volume encompassed by the source surface 18 may be chosen as desired, as long as the physical device under test 10 is confined by the source surface 18 of the equivalent source 16 as illustrated.

In some embodiments, the equivalent source 16 may relate to a Huygens source having the source surface 18 that may relate to a Huygens surface accordingly.

Generally, the equivalent source 16 is calculated so as to have a simulated electromagnetic field on the measurement surface 14, which is similar to the one measured on the measurement surface 14, e.g. the electric field and the magnetic field of the physical device under test 10. In other words, the equivalent source 16 with its source surface 18 is calculated such that its simulated electromagnetic field has the (substantially) same characteristics on the measurement surface 14 as the physical device under test 10 has, e.g. the electromagnetic field radiated by the physical device under test 10.

Accordingly, the equivalent source 16 corresponds to a simulated object having the same characteristics on the measurement surface 14 as the real device under test 12 has, namely in the real world. On the measurement surface 14, the electromagnetic field measured, e.g. the measurement data, corresponds to the simulated electromagnetic field of the equivalent source 16.

Hence, the equivalent source 16 is calculated by an algorithm applied in order to ensure the respective characteristics on the measurement surface 14 are obtained for a simulated electromagnetic field of the equivalent source 16. Consequently, the source surface 18 may relate to a numerical field surface obtained by the algorithm applied.

In a third step 3), a model is provided that comprises the equivalent source 16 determined as well as at least one modeled scatterer 20. In some embodiments, the equivalent source 16 is imported in the simulation model with the additional scatterer 20 nearby.

In some embodiments, the equivalent source 16 determined is used as an excitation source, wherein a monitoring surface 22 is created that encompasses the equivalent source 16 with its source surface 18. The monitoring surface 22 is illustrated by dashed lines in step 3) of FIG. 1. In some embodiments, the monitoring surface 22 is larger than the source surface 18 or similar to the source surface 18, thereby ensuring that the equivalent source 16 is encompassed by the monitoring surface 22.

However, the monitoring surface 22 does not encompass the at least one modeled scatterer 20 or cross the at least one modeled scatterer 20 as shown in step 3) of FIG. 1.

The physical device under test 10 is again illustrated in a shaded manner since it is not present anymore, as step 3) is also performed by a calculation program executed on a processing circuit.

In other words, the equivalent source 16 determined is imported in a simulation module, namely a processing circuit executing a simulation (model), that inter alia simulates the at least one modeled scatterer 20 nearby the equivalent source 16. The simulation module, for example the simulation model executed, further calculates the monitoring surface 22 being close to the source surface 18, as illustrated in FIG. 1.

Afterwards, an electromagnetic field of the equivalent source 16 is calculated over the monitoring surface 22.

Based on the electromagnetic field calculated and in presence of the at least one modeled scatterer 20, a total radiated power (TRP) is evaluated, e.g. on the monitoring surface 22.

In some embodiments, a scattered field (ES, HS) caused by the at least one modeled scatterer 20 interacts with the simulated electromagnetic field E, H of the equivalent source 16 such that an output power of the equivalent source 16 is affected by the scattered field.

In absence of the at least one modeled scatterer 20, a total radiated power through the monitoring surface 22 can be set to the initial total radiated power P0 that was measured during the measurement along the measurement surface 14.

However, when the at least one modeled scatterer 20 is present, for example close to the equivalent source 16 or the monitoring surface 22 closely encompassing the equivalent source 16, the scattered field ES, HS has an influence on the total radiated power.

Figure 2:
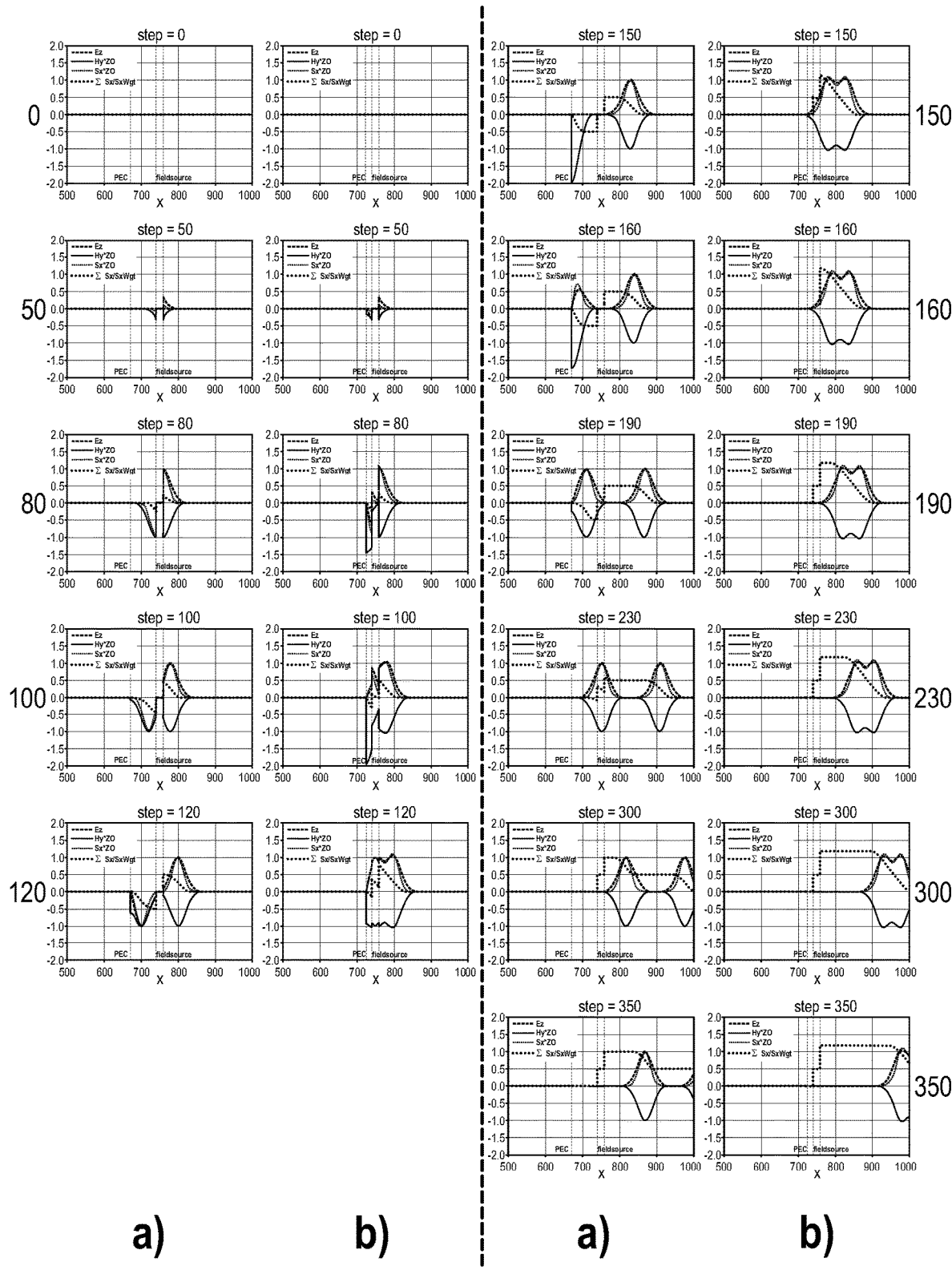

This becomes clear when referring to FIG. 2 in which two different scenarios are illustrated such that the difference between a scatterer far away from the equivalent source 16 or the device under test 10, labelled as scenario a), and a scatterer 20 close to the equivalent source 16 or the device under test 10, labelled as scenario b), is illustrated in more detail, for example the temporal behavior of two pulses generated by a field source.

The field source, also called excitation source, excites pulses or waves, e.g. TEM waves, that travel into opposite directions, e.g. the left side and the right side. In other words, the respective pulse causes a wave. The respective scatterer, i.e. a perfect electrical conducting ("PEC") wall, is located on the left side of the field source, namely far away according to the scenario a) or close to according to the scenario b).

In the graphs, the positions of the scatterer and the field source are illustrated by vertical dashed lines. Moreover, the temporal behavior of the pulses, namely the waves caused, is illustrated by a respective z-component of the E-field (Ex=Ey=0), a respective z-component of the H-field times free space impedance Z0 (Hx=Hy=0), a respective z-component of the Poynting vector (Sy=Sz=0) as well as the summed up Sx normalized to the total energy of the pulses, namely $\sum [Sx/SxWgt]$.

The temporal behavior is illustrated since several steps are illustrated in a column-like manner, wherein four columns are shown. The far left and the center-right columns belong together while illustrating the temporal behavior of the scatterer far away of the equivalent source 16 or the device under test 10, which corresponds to an expected behavior. They are also labelled by a). The center-left and the far right columns belong together while illustrating the temporal behavior of the scatterer close to the equivalent source 16 or the device under test 10. They are also labelled by b).

Hence, the graphs of the far left and center-left columns relate to the same temporal steps. The same applies to the graphs of the center-right and the far right columns.

From FIG. 2, it becomes clear that a distinction takes place between the different locations of the scatterer, for example the reflected pulse/wave.

Starting from step 0, the field source radiates pulses/waves into left and right direction which becomes clear when comparing the graphs of step 50 and step 0.

Further, the graph of step 80 shows that the pulse/wave originally traveling to the left gets already reflected at the scatterer ("PEC") located close to the field source, thereby altering the shape of the left-side pulse/wave (center-left column of FIG. 2 at step 100), whereas, for the scatterer located far away, the pulse/wave originally traveling to the left continues to travel in an undisturbed manner.

In step 100, the reflected pulse/wave hits both sides of the field source while the field source (excitation source) still excites, as the excitation pulse has not attenuated, as shown in b), for example the center-left column of FIG. 2.

In step 120, the pulse/wave in the first scenario (scatterer far away) now gets reflected by the scatterer, as illustrated in a), namely the far left column of FIG. 2.

In step 150, the reflected pulse/wave and the original pulse/wave traveling to the right have interfered with each other, thereby providing a combined wave package that travels to the right, as shown in b), namely the upper graph in the far right column of FIG. 2. At this point, it also becomes clear that the summed up Sx normalized to the total energy of the pulses, namely $\sum [Sx/SxWgt]$, is higher than 1 at the field source for the closely located scatterer. In contrast thereto, summed up Sx normalized to the total energy of the pulses, namely $\sum [Sx/SxWgt]$, is 0.5 at the field source for the scatterer $\sum$ is located far away.

In step 160, it is shown in the center-right column of FIG. 2, namely the scenario in which the scatterer is located far away, that the Ez-component of the left pulse/wave flips from negative to positive values due to the scatterer.

In step 190, the reflected pulse/wave for the scenario in which the scatterer is located far away also starts travelling to the right due to the reflection at the scatter located far away.

In the other scenario shown in b), namely the far right column, the combined wave package travels further to the right while the summed up Sx normalized to the total energy of the pulses/waves, namely $\sum [Sx/SxWgt]$, is higher than 1 at further locations. $\sum$ In step 230, the reflected pulse/wave for the scenario in which the scatterer is located far away now passes the field source. In this scenario, the excitation pulses already attenuated, causing a different behavior compared to step 100 of the scenario in which the scatterer is located close. In some embodiments, the reflected pulse/wave for the scenario in which the scatterer is located far away does not interact with the pulse/wave originally travelling to the right. As illustrated, two separate pulses/waves travel to the right in a separate manner.

In step 300, the pulses/waves for the scenario in which the scatterer is located far away are still separated, but further travelling to the right. For the scenario in which the scatterer is located close, the combined wave package also travels further to the right.

As shown in steps 300 and 350, the summed up Sx normalized to the total energy of the pulses/waves, namely $\sum [Sx/SxWgt]$, becomes higher than 1 for the scenario in which the scatterer is located close, whereas, for the scenario in which the scatterer is located far away, the summed up Sx normalized to the total energy of the pulses/waves, namely $\sum [Sx/SxWgt]$, equals to 1 as expected.

From the temporal behaviors obtained for the different scenarios, it becomes clear that, in the scenario in which the scatterer is located close, the reflected wave hits the field source while the field source is still exciting, thereby affecting the total radiated energy of the field source This difference clearly illustrates why a normalization factor has to be determined for the scenario in which the scatterer is located close, for example in-situ rather than previously.

Accordingly, a total radiated power P1 may differ from the initial one, P0, due to the additional modeled scatterer 20, e.g. its influence.

However, at least one normalization factor can be determined based on the total radiated power P1 determined over the monitoring surface 22 with the at least one modeled scatterer 20 as well as the measurement data, namely the initial total radiated power P0 measured.

For instance, a normalization factor for the power, a normalization factor for the electric field and a normalization factor for the magnetic field may be calculated, which can be used to increase the efficiency and the accuracy of the normalization such that improved simulation results are obtained, for example taking the effect into account, which is shown in FIG. 2.

In some embodiments, the normalization factor for the power may relate to a quotient of the initial total radiated power and the total radiated power determined, namely P0/P1.

In some embodiments, the normalization factor for the electric field or the magnetic field may relate to a square root of the quotient of the initial total radiated power and the total radiated power determined.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a graphical processing unit (GPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In some embodiments, one or more computer-readable media contain computer readable instructions embodied thereon that, when executed by one or more processor circuits, sometimes referred to as computing devices, cause the one or more processor circuits to perform one or more steps of any of the methods of provided herein.

In some embodiments, the analysis circuit and/or the processing circuit is programmed to carry out one or more steps of any of the methods disclosed herein. In some embodiments, one or more computer-readable media associated with or accessible by the the analysis circuit and/or the processing circuit contains computer readable instructions embodied thereon that, when executed by the analysis circuit and/or the processing circuit, cause the respective circuit(s) to perform one or more steps of any of the methods disclosed herein.

According to some embodiments, many individual steps of a process may or may not be carried out utilizing computer or computing based systems described herein, and the degree of computer implementation may vary, as may be desirable and/or beneficial for one or more particular applications.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this disclosure, the same or similar elements may bear the same references. Furthermore, the presence of reference numbers or letters in the drawings cannot be considered limiting, even when such numbers or letters are indicated in the claims.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of evaluating an electromagnetic field of a device under test, wherein the method comprises:
   providing a device under test that radiates an electromagnetic field,
   performing a measurement of the device under test in order to obtain measurement data, wherein at least two components of the electromagnetic field of the device under test are measured with regard to their magnitude and phase over a measurement surface,
   determining an equivalent source of the device under test based on the measurement data, wherein the equivalent source has a source surface that is different than the measurement surface,
   providing a model that comprises the equivalent source determined and at least one modeled scatterer, wherein the equivalent source determined is used as an excitation source,
   creating a monitoring surface that encompasses the equivalent source with its source surface, but does not encompass the at least one modeled scatterer or cross the at least one modeled scatterer,
   calculating an electromagnetic field of the equivalent source over the monitoring surface,
   evaluating a total radiated power based on the electromagnetic field of the equivalent source calculated over the monitoring surface in presence of the at least one modeled scatterer, and
   determining at least one normalization factor based on the total radiated power determined and the measurement data.

2. The method according to claim 1, wherein an initial total radiated power is measured when performing the measurement of the device under test on the measurement surface, and wherein the at least one normalization factor is determined based on the initial total radiated power and the total radiated power determined on the monitoring surface.

3. The method according to claim 1, wherein a normalization factor for the power, a normalization factor for the electric field and/or a normalization factor for the magnetic field are/is calculated.

4. The method according to claim 1, wherein an initial total radiated power is measured when performing the measurement of the device under test on the measurement surface, wherein the at least one normalization factor is determined based on the initial total radiated power and the total radiated power determined on the monitoring surface, and wherein a normalization factor for the power is a quotient of the initial total radiated power and the total radiated power determined on the monitoring surface.

5. The method according to claim 1, wherein an initial total radiated power is measured when performing the measurement of the device under test on the measurement surface, wherein the at least one normalization factor is determined based on the initial total radiated power and the total radiated power determined on the monitoring surface, and wherein a normalization factor for the electric field and/or a normalization factor for the magnetic field is a square root of a quotient of the initial total radiated power and the total radiated power determined on the monitoring surface.

6. The method according to claim 1, wherein the equivalent source is determined such that a simulated electromagnetic field of the equivalent source on the measurement surface is similar to the electromagnetic field of the device under test measured on the measurement surface.

7. The method according to claim 1, wherein a scattered electromagnetic field of the at least one modeled scatterer is taken into account when determining the at least one normalization factor.

8. The method according to claim 1, wherein the device under test is fully encompassed by at least one of the source surface and the monitoring surface.

9. The method according to claim 1, wherein at least one of the source surface and the monitoring surface does not cross the device under test.

10. The method according to claim 1, wherein the equivalent source is determined based on an algorithm applied.

11. The method according to claim 1, wherein the equivalent source is a Huygens source and the source surface is a Huygens surface.

12. The method according to claim 1, wherein the source surface is a numerical field surface.

13. The method according to claim 1, wherein the at least one modeled scatterer provides a scattering environment.

14. The method according to claim 1, wherein the device under test is encompassed by the measurement surface.

15. The method according to claim 1, wherein the measurement surface is a spherical surface.

16. The method according to claim 1, wherein the measurement is a free space measurement and/or wherein the measurement is performed in an anechoic chamber.

17. A method of evaluating an electromagnetic field of a device under test, wherein the method comprises the steps of:
- providing a device under test that radiates an electromagnetic field,
- performing a measurement of the device under test in order to obtain measurement data, wherein at least two components of the electromagnetic field of the device under test are measured with regard to their magnitude and phase over a measurement surface,
- determining an equivalent source of the device under test based on the measurement data, wherein the equivalent source has a source surface that is different than the measurement surface, wherein the equivalent source is a Huygens source and the source surface is a Huygens surface,
- providing a model that comprises the Huygens source determined and at least one modeled scatterer, wherein the Huygens source determined is used as an excitation source,
- creating a monitoring surface that encompasses the Huygens source with its Huygens surface, but does not encompass the at least one modeled scatterer or cross the at least one modeled scatterer,
- calculating an electromagnetic field of the Huygens source over the monitoring surface,
- evaluating a total radiated power based on the calculated electromagnetic field in presence of the at least one modeled scatterer, and
- determining at least one normalization factor based on the total radiated power determined and the measurement data.

18. A method of evaluating an electromagnetic field of a device under test, wherein the method comprises the steps of:
- providing a device under test that radiates an electromagnetic field,
- performing a measurement of the device under test in order to obtain measurement data, wherein at least two components of the electromagnetic field of the device under test are measured with regard to their magnitude and phase over a measurement surface,
- determining an equivalent source of the device under test based on the measurement data, wherein the equivalent source has a source surface that is different than the measurement surface,
- providing a model that comprises the equivalent source determined and at least one modeled scatterer, wherein the equivalent source determined is used as an excitation source,
- creating a monitoring surface that encompasses the equivalent source, but does not encompass the at least one modeled scatterer or cross the at least one modeled scatterer,
- calculating an electromagnetic field of the equivalent source over the monitoring surface,
- evaluating a total radiated power based on the calculated electromagnetic field in presence of the at least one modeled scatterer, and
- determining at least one normalization factor based on the total radiated power determined and the measurement data such that an in-situ normalization is used, which is based on electromagnetic waves crossing the monitoring surface and the measurement data obtained when measuring the at least two components of the electromagnetic field with regard to their magnitude and phase over the measurement surface.

* * * * *